United States Patent
Singhal et al.

(10) Patent No.: US 12,047,431 B2
(45) Date of Patent: Jul. 23, 2024

(54) REST CLIENT SCALING OVER HTTP/1.1

(71) Applicant: Parallel Wireless, Inc., Nashua, NH (US)

(72) Inventors: Mukesh Singhal, Pune (IN); Girish Desai, Maharashtra (IN); Raghu Kota, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/053,372

(22) Filed: Nov. 7, 2022

(65) Prior Publication Data
US 2023/0142986 A1  May 11, 2023

Related U.S. Application Data

(60) Provisional application No. 63/276,085, filed on Nov. 5, 2021.

(51) Int. Cl.
*H04L 67/02* (2022.01)
*G06F 8/656* (2018.01)

(52) U.S. Cl.
CPC .............. *H04L 67/02* (2013.01); *G06F 8/656* (2018.02)

(58) Field of Classification Search
None
See application file for complete search history.

(56) References Cited

U.S. PATENT DOCUMENTS

| 7,937,703 | B2 * | 5/2011 | Bethea | H04L 67/566 |
| | | | | 709/248 |
| 11,301,350 | B1 * | 4/2022 | Byrne | G06F 11/263 |
| 11,483,790 | B2 * | 10/2022 | Rajput | H04W 60/005 |
| 2018/0262391 | A1 * | 9/2018 | Jung | H04L 67/02 |

(Continued)

OTHER PUBLICATIONS

"Why are RESTful Applications easier to scale", https://stackoverflow.com/questions/11297471/why-are-restful-applications-easier-to-scale; post created Jul. 2, 2012; downloaded Mar. 5, 2024.

(Continued)

*Primary Examiner* — Lashonda Jacobs-Burton
(74) *Attorney, Agent, or Firm* — Michael Y. Saji (57) ABSTRACT

A wireless network system is described. In some scenarios MME/MSC/SGSN may act as a client which has huge amount of real-time data to be delivered towards server. For this speedy and reliable delivery requirement, a approach has been proposed which will use multiple parallel HTTP connections for delivery and also make sure that the events related to a particular node is delivered in right order. The multiple HTTP connections are used for parallel delivery so that in case one connections fails then it may not impact other existing connections. The number of connections may grow dynamically up to the configured limit depending on the data delivery requirements and then it may dynamically shrink once the load is reduced. A key based approach is proposed where each connected node will be assigned a unique key which will be used for sequencing the messages related to events of this particular node. In this way we can achieve in-order delivery of data which is dependent on each other along with parallel delivery of data which is independent of each other.

14 Claims, 8 Drawing Sheets

(56) References Cited

U.S. PATENT DOCUMENTS

2023/0075944 A1    3/2023    Desai et al.

OTHER PUBLICATIONS

"How would you scale a rest api to serve +10,000 req/s?", https://www.reddit.com/r/node/comments/98t937/how_would_you_scale_a_rest_api_to_serve_10000_reqs/; post created 2018; downloaded Mar. 5, 2024.

"Best way to scale a service that fetches data and has a Rest API to query it", https://softwareengineering.stackexchange.com/questions/415487/best-way-to-scale-a-service-that-fetches-data-and-has-a-rest-api-to-query-it; post created Sep. 2, 2020; downloaded Mar. 5, 2024.

* cited by examiner

REST CLIENT SCALING OVER HTTP/1.1

CROSS-REFERENCE TO RELATED APPLICATIONS

The present application claims priority under 35 U.S.C. § 119(e) to U.S. Provisional Patent No. 63/276,085, filed Nov. 5, 2021, having the same title as the present application and hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, 71717US01, 71721US01, 71756US01, 71762US01, 71819US00, and 71820US01, respectively. This application also hereby incorporates by reference in their entirety each of the following U.S. Pat. applications or Pat. App. Publications: US20150098387A1; US20170055186A1; US20170273134A1; US20170272330A1; and U.S. Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The Representational State Transfer (REST) Application Program Interfaces (APIs) over Hypertext Transfer Protocol (HTTP) are widely used across various application in client server model. Normally, the processing on client is not heavy and server is the data generating entity in the client-server model but there are some deployments where this is not true. In telecom network, usually a single node like Mobility Management Entity (MME)/Mobile Switching Center (MSC)/Serving GPRS Support Node (SGSN) controls N number of nodes in the network and may want to push the events (data) related to these connected nodes to some other node for further processing or storage.

A microservice is a software development technique—a variant of the service-oriented architecture (SOA) architectural style that structures an application as a collection of loosely coupled services. In a microservices architecture, services are fine-grained and the protocols are lightweight. The benefit of decomposing an application into different smaller services is that it improves modularity and makes the application easier to understand, develop, test, and more resilient to architecture erosion. It also parallelizes development by enabling small autonomous teams to develop, deploy and scale their respective services independently. It also allows the architecture of an individual service to emerge through continuous refactoring. Microservices-based architectures enable continuous delivery and deployment.

SUMMARY

A wireless network system is described. In some scenarios MME/MSC/SGSN may act as a client which has huge amount of real-time data to be delivered towards server. For this speedy and reliable delivery requirement, a approach has been proposed which will use multiple parallel HTTP connections for delivery and also make sure that the events related to a particular node is delivered in right order. The multiple HTTP connections are used for parallel delivery so that in case one connections fails then it may not impact other existing connections. The number of connections may grow dynamically up to the configured limit depending on the data delivery requirements and then it may dynamically shrink once the load is reduced. In order to make sure that the events related to single node are delivered sequentially, a key based approach is proposed where each connected node will be assigned a unique key which will be used for sequencing the messages related to events of this particular node. All other nodes which have different keys would be scheduled in parallel with each other. In this way we can achieve in-order delivery of data which is dependent on each other along with parallel delivery of data which is independent of each other.

In one embodiment, a method includes spawning a new Hypertext Transfer Protocol (HTTP) connection for a received message sent using a Representational State Transfer (REST) interface over HTTP/1.1; using different connections for each message to be sent, to ensure no message is delayed due to delay in response from server for current on-going message; receiving a response for a message and refraining from closing the connection for a predefined timeout period; when a message is received before idle connection timeout, then using the same connection instead of spawning new connection; and if there is no idle connection available, then opening a new connection.

In another embodiment a method includes marking each message with a specific key which depends on data present in the message, wherein generated data to be delivered in sequence is marked with a same key, and wherein messages having different keys are independent of each other and re delivered parallelly; spawning a connection when a message is received and sending that message over the connection, wherein all messages with different keys are scheduled parallelly on different connections until a maximum connection limit is reached; storing incoming messages in a buffer once the maximum connection limit is reached.

In another embodiment, a method may be disclosed, comprising: spawning a first Hypertext Transfer Protocol (HTTP) connection for a received message from a first telecom node to a telecom server, sent using a Representational State Transfer (REST) interface over HTTP; opening a second HTTP connection for a second received message from a second telecom node, to ensure the second received message may be not delayed due to delay in response from the telecom server in response to the first received message from the first telecom node to the telecom server; receiving a response for the first received message and refraining from closing the first HTTP connection for a predefined timeout period; when a third message may be received before idle connection timeout, then using the same connection instead of opening a new connection; and tracking the originating first telecom node and delivering the response to the first telecom node.

The method may further comprise if there may be no idle connection available, then using a message send buffer to queue messages to be sent. The method may further comprise using a single process for the first and the second HTTP connection. The method may further comprise when there may be no idle connection available, then tracking a plurality of messages using a response wait list and a message send buffer. The HTTP connection may be using the HTTP 1.1 protocol.

The method may further comprise using a response wait list with telecom node keys to enable blocking of messages between a given telecom node to the telecom server until a response may be received from the telecom server to the given telecom node. The method may further comprise: marking each message with a specific key which depends on data present in the message, wherein generated data to be delivered in sequence may be marked with a same key, and wherein messages having different keys may be independent of each other and re delivered parallelly; spawning a connection when a message may be received and sending that message over the connection, wherein all messages with different keys may be scheduled parallelly on different connections until a maximum connection limit may be reached; and storing incoming messages in a buffer once the maximum connection limit may be reached.

In another embodiment, a non-transitive computer-readable medium is disclosed including instructions which, when executed on a telecom server, cause the telecom server to perform operations comprising: spawning a first Hypertext Transfer Protocol (HTTP) connection for a received message from a first telecom node to a telecom server, sent using a Representational State Transfer (REST) interface over HTTP; opening a second HTTP connection for a second received message from a second telecom node, to ensure the second received message may be not delayed due to delay in response from the telecom server in response to the first received message from the first telecom node to the telecom server; receiving a response for the first received message and refraining from closing the first HTTP connection for a predefined timeout period; when a third message may be received before idle connection timeout, then using the same connection instead of opening a new connection; and tracking the originating first telecom node and delivering the response to the first telecom node.

The instructions may further comprise if there may be no idle connection available, then using a message send buffer to queue messages to be sent. The instructions may further comprise using a single process for the first and the second HTTP connection. The instructions may further comprise when there may be no idle connection available, then tracking a plurality of messages using a response wait list and a message send buffer. The HTTP connection may be using the HTTP 1.1 protocol.

The instructions may further comprise using a response wait list with telecom node keys to enable blocking of messages between a given telecom node to the telecom server until a response may be received from the telecom server to the given telecom node. The instructions may further comprise: marking each message with a specific key which depends on data present in the message, wherein generated data to be delivered in sequence may be marked with a same key, and wherein messages having different keys may be independent of each other and re delivered parallelly; spawning a connection when a message may be received and sending that message over the connection, wherein all messages with different keys may be scheduled parallelly on different connections until a maximum connection limit may be reached; and storing incoming messages in a buffer once the maximum connection limit may be reached.

DETAILED DESCRIPTION

HTTP 1.1/REST client scaling via single process wherein 1000s of transaction can happen in parallel with efficient CPU & memory utilization. Transaction can be inter-dependent or independent in nature. For inter-dependent transactions delivery order to server should be in order of generation while independent transaction can be delivered as needed.

In the existing client-server model, if client is the one which generated huge amount of real-time data and it needs to be pushed to the server, we need a mechanism for fast delivery using parallelism but at the same time the data dependent on each other needs to be delivered in right order. In order to achieve this using HTTP/1.1, we may require multiple HTTP connections as HTTP/1.1 is head of the line blocking which may increase the amount of resources used.

In order achieve the fast delivery using HTTP/1.1, multiple parallel connections could be used as single connection in HTTP/1.1 is head of the line blocking. We are proposing a single process approach which would be less resource consuming. Single process would mean single Central Processing Unit (CPU) core utilization and hence CPU would not be overloaded with just HTTP connection handling. The single process approach for multiple HTTP connections can be achieved using non-blocking sockets and event-based architecture. Instead of staying blocked on a single socket, we can use the event loop where socket events would be fed to the event-loop and would be executed sequentially one after another. The number of sockets would be opened depending on the systems memory capability and the speed of handling socket events would also depend on the systems CPU speed. In case load of transaction is as high as 50K transactions per second then considering 20 ms as round-trip time we can use 1000 connections would be sufficient for our purpose (assuming that system processing is much smaller than the RTT). As most of the HTTP requests would have small body HTTP body, we can keep the TCP buffer as small as 8 KB. With 8 KB memory size for read and write buffer of Transmission Control Protocol (TCP), we can operate 1000 connections with just 16 MB of memory utilization. If we plan to increase maximum connection limit to 2000 then we can perform 100K transactions by using 32 MB of buffers.

In some cases, when data is generated by a network function and it is to be sent using REST interface over HTTP/1.1, we will spawn a new HTTP connection for that message. The HTTP connections would be spawned as and when the messages are received, and they would be delivered parallelly. The maximum number of parallel connections possible depends on the system capability. By using different connections for each message to be sent, we make sure no message is delayed due to delay in response from server for current on-going message. With HTTP/1.1, the existing connections could be reused again for new messages to be sent. Once the response is received for some message then instead of closing that connection immediately, it can be kept open for some pre-defined idle timeout period. If we receive some message before idle connection timeout then the same connection can be re-used instead of spawning new connection. If there is no idle connection available, then new connection can be opened. With this dynamically growing and shrinking connection we may always have optimum connection open depending on the load of data generated by the network node.

Along with parallel message delivery, we also desire to deliver all the messages which are correlated with each other in right order so that the resultant effect of the data at the receiving end would be as expected. The key based approach is proposed in order maintain the in-order delivery along with parallel connections. Each message which is marked with a specific key which depends on the data present in that message. The generated data which is supposed to be delivered in sequence is marked with a same key. The message having different keys are independent of each other and could be delivered parallelly.

In some cases, when certain messages are received, a connection is spawned, and that message is sent over that connection. All messages with different keys are scheduled parallelly on different connections until we reach the maximum connection limit. Once the maximum connection limit is reached then we store the incoming messages into buffer, called a Message Send Buffer. A separate buffer called a Response Wait List is maintained to track the message which are in progress and for which response is pending. The Response Wait List can be used to find out the message with which key is in progress. This approach is stateful, but only limited state is being tracked.

For transactions that are dependent, we need to schedule in a sequence. At time of receipt, the application can give us info such as hints on whether they require to be queued. Application provides some identification whether this REST message is needed.

Figure 1:
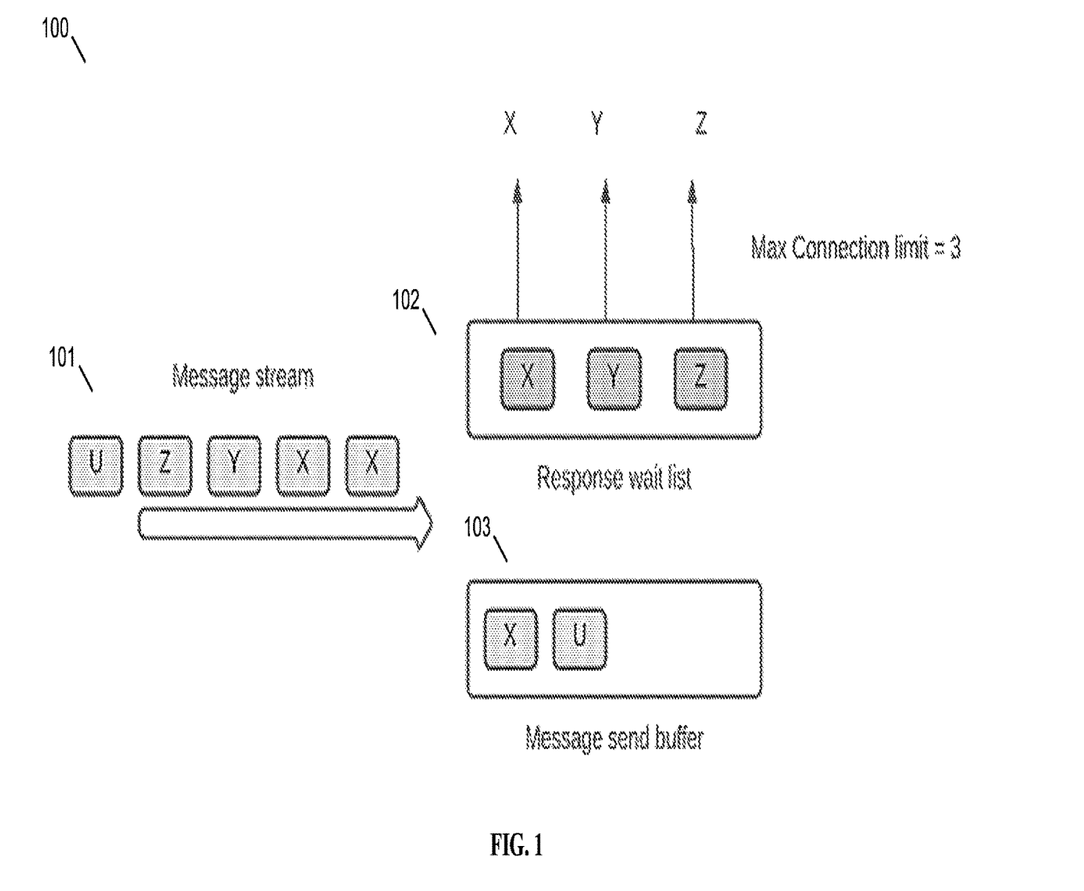
FIG. 1 is a representation of a message stream from a plurality of sources, in accordance with some embodiments.

FIG. 1 is a representation of a message stream 101 from a plurality of sources, in accordance with some embodiments. A message stream 101 is shown. If message with key X is sent on the wire and if we are waiting for response then the other message with key X will not be sent parallelly, it will be stored in message send buffer 102 (response wait list). If the maximum connection limit is reached then other messages will also be stored in buffer 102. Otherwise the messages are stored in message send buffer 103 and then sent. Once response for message with key X is received then the message with key X will be picked from the buffer 102 and it will be sent via same connection. If response for any other message is received, or if response for message with key X continues not to be received, then the message with key U will be scheduled (placed in message send buffer 103) as there is no other message with key U which is in sent state, or another message with another key will be scheduled and sent for which no response is being awaited in the response wait list.

Figure 2A:
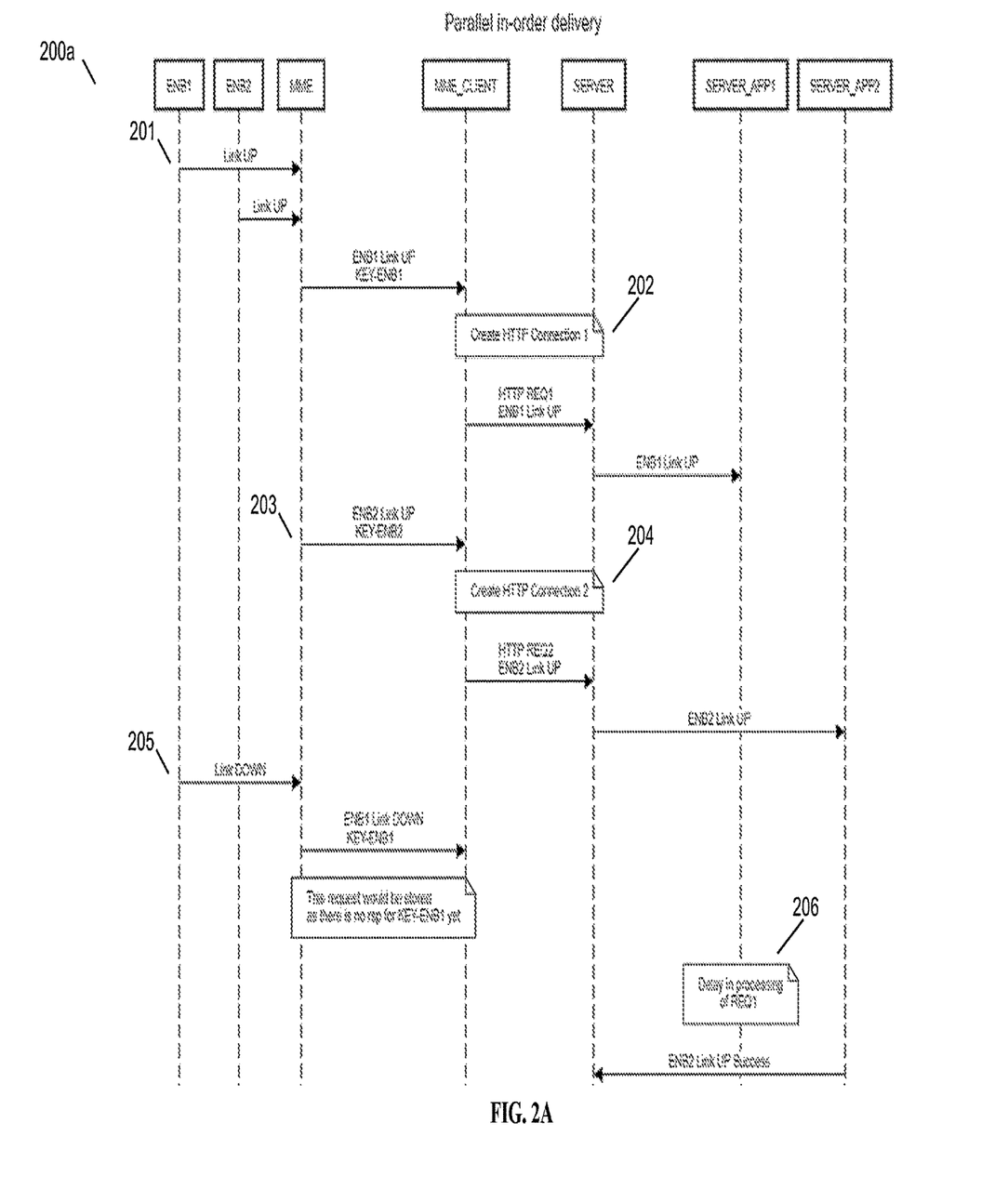
FIGS. 2A and 2B are a first portion and a second portion of a call flow showing parallel in-order delivery of data, in accordance with some embodiments.
Figure 2B:
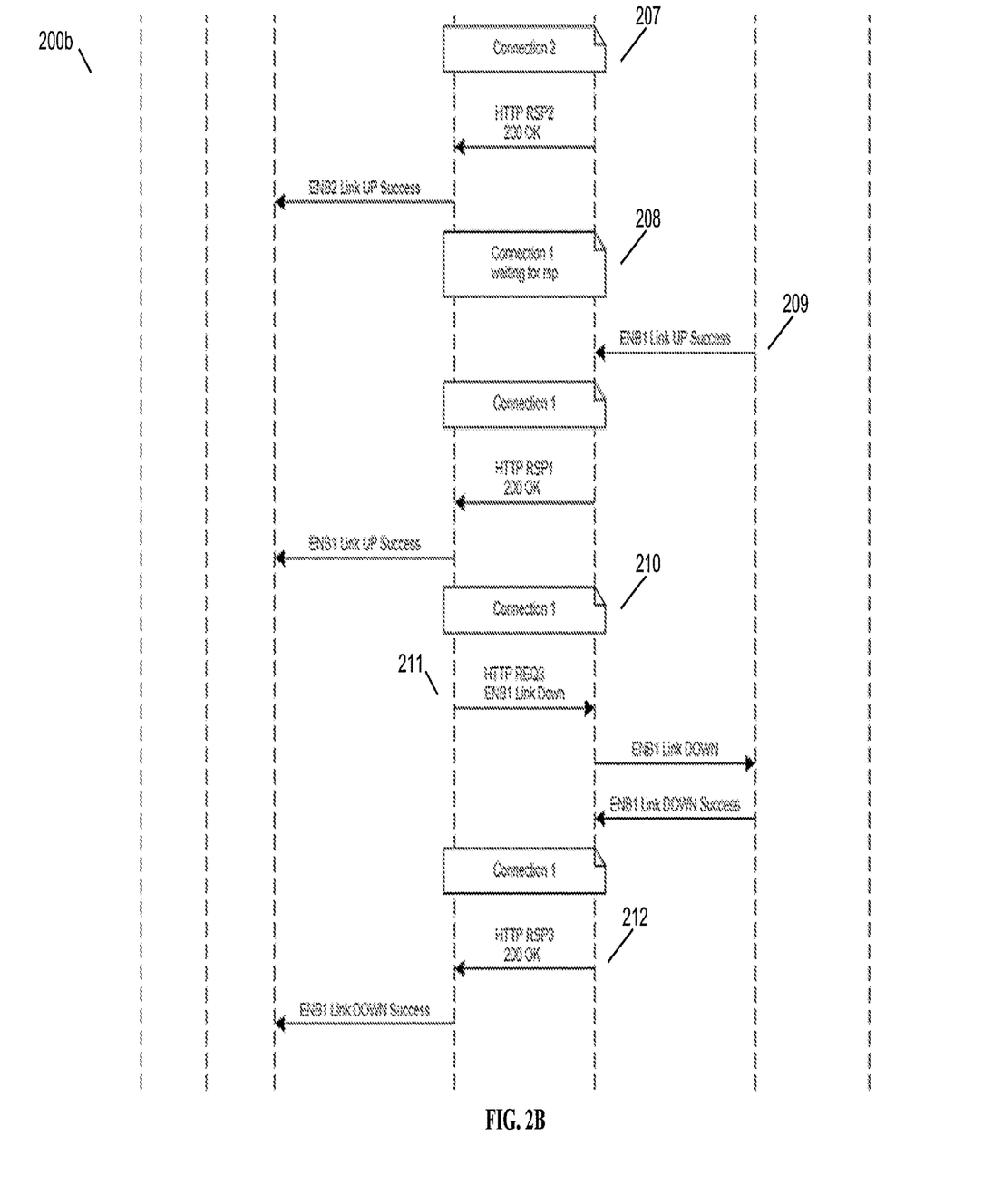

FIGS. 2A and 2B are a first portion and a second portion of a call flow showing parallel in-order delivery of data, in accordance with some embodiments.

At step 201, the MME gets a LINK UP or link state change request, and the MME must send that information to a server, such as a SON server. MME and MME_CLIENT are part of a single task or process at a single server. In this scenario, ENB1 and ENB2 are being managed by MME. At step 202, MME_CLIENT creates HTTP connection 1, and MME_CLIENT creates keys to differentiate between different messages. At step 203, a new link comes up and a new key KEY-ENB2 is created, and a new HTTP connection 2 is created at step 204. An ENB unique ID could be used to generate KEY-ENB1 and KEY-ENB2.

Suppose there is a delay somewhere upstream of MME_CLIENT. For example, suppose SERVER has multiple microservices SERVER_APP1 and SERVER_APP2. Responses are queued at MME_CLIENT so that MME receives the messages in the appropriate order.

Continuing with the example of the delay in processing of REQ1, shown at 206, Processing of REQ2 is not blocked and proceeds, but further upstream requests tagged with KEY-ENB1 are queued until processing concludes at SERVER_APP1. Then they are delivered and processed. As shown at step 205, ENB1 Link Down occurs.

At step 207, connection 2 is completed and ENB2 Link Up succeeds.

At step 208, connection 1 remains in process and is waiting for response. At step 209, once a response is received from SERVER_APP1, ENB1 Link Up occurs. At step 210, connection 1 is completed. At step 211, ENB1 Link Down is requested by MME_CLIENT. Once the server acknowledges this at step 212, the Link Down succeeds.

Primary goal was single core write. One thread is sufficient for the complete solution, managing both queues. This approach could be done on multiple threads as well if desired. Single threading offers certain advantages in some limited processing situations. The relevant tasks were at least ones for which the server cannot devote intensive resources to this particular thing. Kernel notifications are used to manage receiving incoming messages from the buffers. HNG event architecture uses socket-based non-blocking connections. The thread makes requests and the kernel surfaces responses via the socket interface.

Multiple connections are enabled by the use of HTTP/1.1. Here we create 2 HTTP connections, HTTP Connection 1 and HTTP Connection 2. We don't terminate the connection right away. Keep it alive for a few seconds to make sure there are no further necessary communications. With only one connection, there is the problem of head-of-the-line blocking, which is resolved with this solution. With HTTP/2, multiple streams on the same connection. 5G uses HTTP/2 instead of HTTP/1.1. However the same keying, scheduling and queueing semantics could be used.

The use of REST is novel for 2G/3G/4G telecom network core services. For server-side, interdependent transactions, we were not able to differentiate at the server side so differentiation is enabled at the client generation side.

In case, if message with key let's say X is being processed on some connection and another message with key X is generated then this message is also stored in the buffer until response for previous message is received. Once the response for message with key X is received then the other message with key X is processed. With this key-based separation of messages, we may have multiple such logical sequences which could be processed parallel by maintaining the in-order delivery of messages containing data related to each other.

Figure 3:
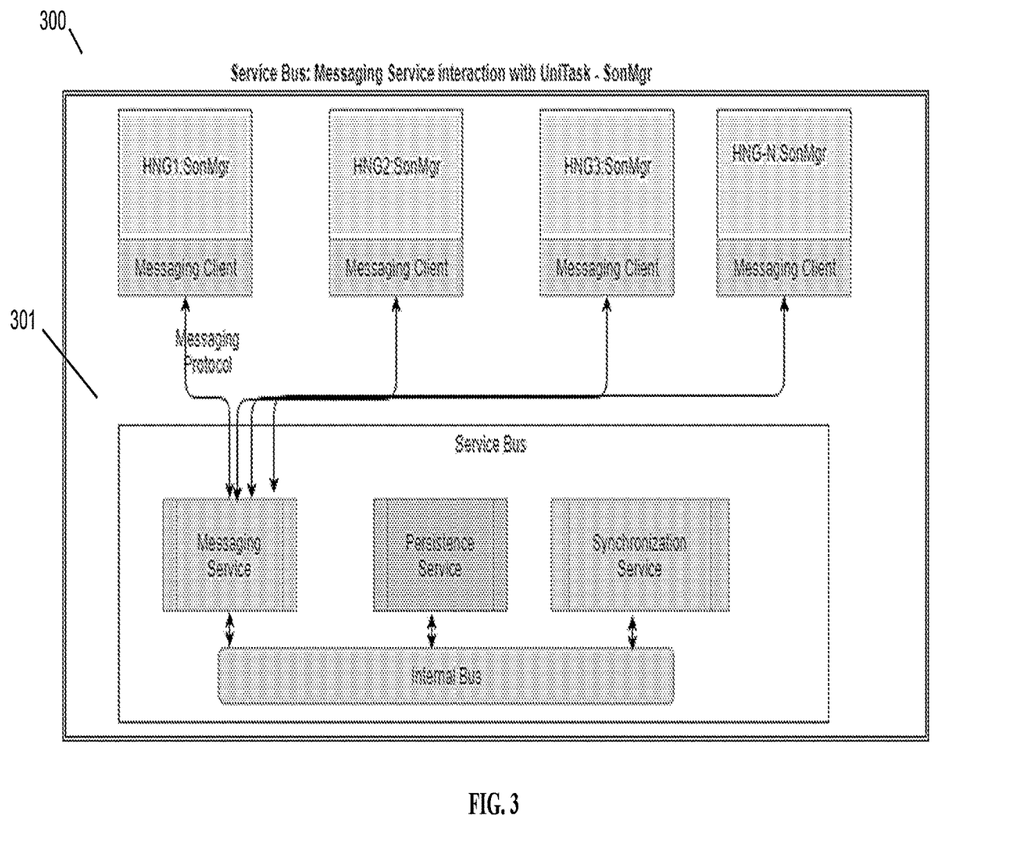
FIG. 3 is a schematic diagram of a service bus messaging service, in accordance with some embodiments.

FIG. 3 is a diagram of a Service Bus messaging service, in accordance with some embodiments. FIG. 3 shows Messaging Service interaction 300. Messaging service of Service Bus 301 provides messaging infrastructure between SonMgr on different HNG's to communicate and share required information. Messaging provides One-To-Many and One-To-One type of communication pattern. Each HNG cluster would be running a SonMgr process. SonMgr would have the messaging client integrated. Using the integrated client, SonMgr would be communicating with the messaging service as shown in FIG. 3. As well, a Persistence Service and a Synchronization Service can be provided in the Service Bus. An internal bus links the Messaging Service, Persistence Service, and Synchronization Service. The messaging protocol used is HTTP/1.1 REST. The embodiments of the present disclosure may be adapted in an appropriate way between any two nodes intermediated by the service bus shown, due to the applicability of the present technique to a variety of HTTP-based messaging connections.

Figure 4:
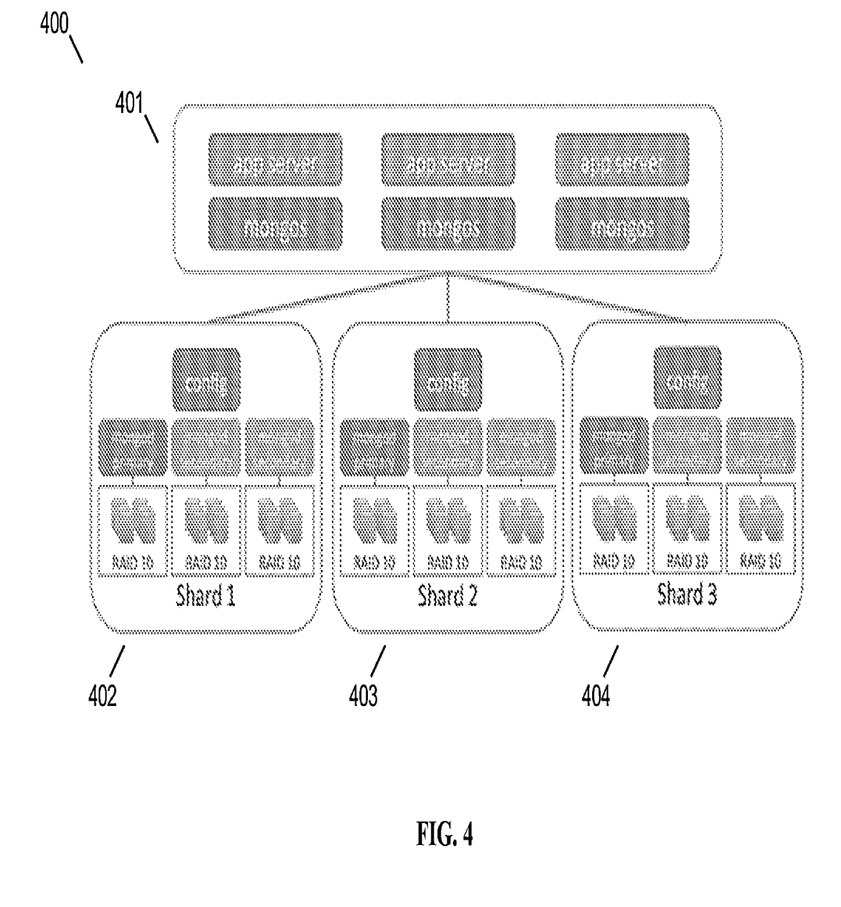
FIG. 4 is a second diagram of a service bus messaging service, in accordance with some embodiments.

FIG. 4 shows a Service Bus realizing a Distributed Data store. Multiple MongoDB database app servers are shown, each sharded as shown here. Each shard has a config front end, coupled with one primary and several secondary database instances. Each database instance is backed by storage, here, shown with exemplary storage in RAID level 10. The embodiments of the present disclosure may be adapted in an appropriate way between any two nodes intermediated by the application servers shown, due to the applicability of the present technique to a variety of HTTP-based messaging connections.

Figure 5:
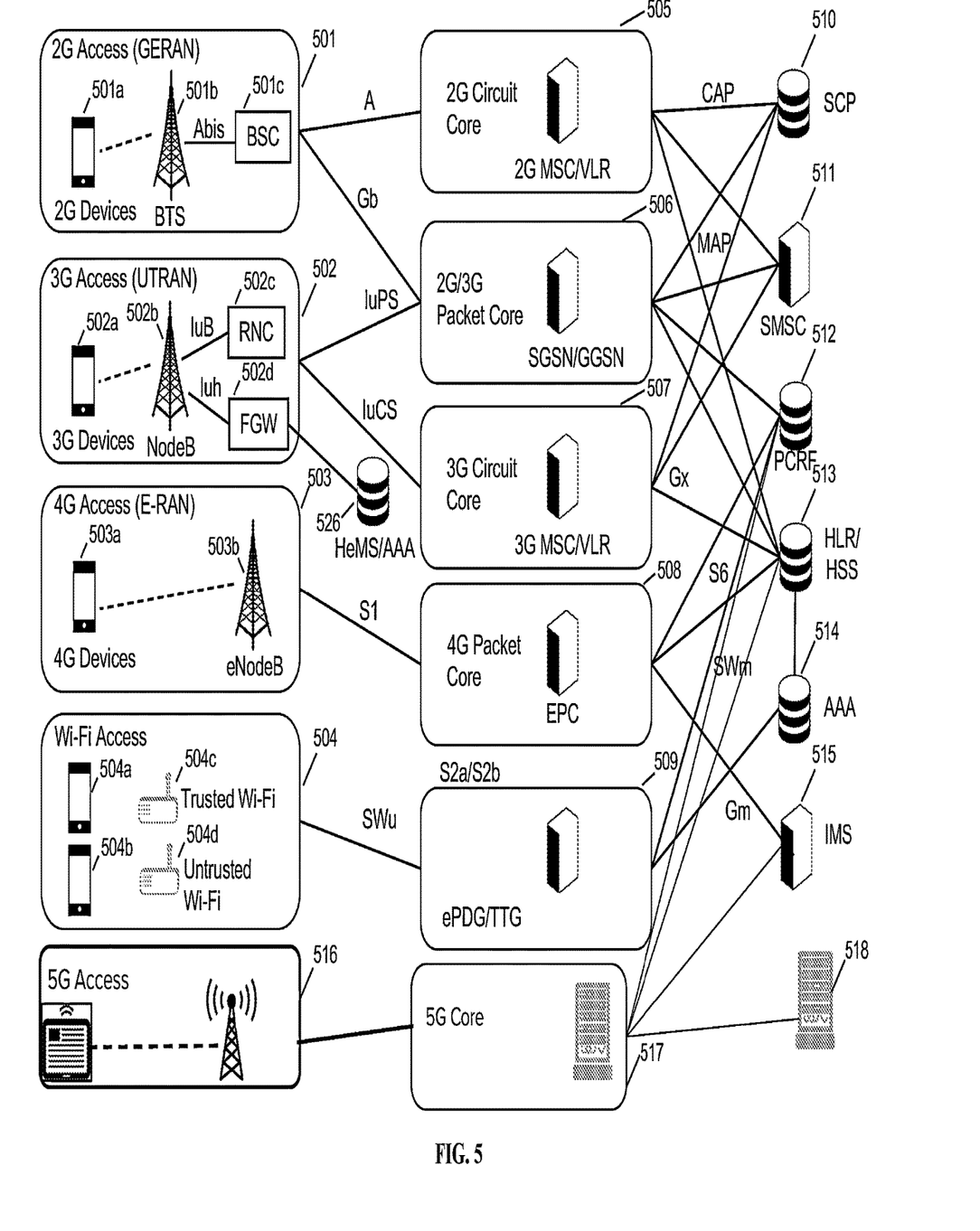
FIG. 5 is a schematic network architecture diagram for various radio access technology core networks, in accordance with some embodiments.

FIG. 5 shows a schematic network architecture diagram for 3G and other-G prior art networks, in accordance with some embodiments. The diagram shows a plurality of "Gs," including 2G, 3G, 4G, 5G and Wi-Fi. 2G is represented by GERAN 501, which includes a 2G device 501*a*, BTS 501*b*, and BSC 501*c*. 3G is represented by UTRAN 502, which includes a 3G UE 502*a*, nodeB 502*b*, RNC 502*c*, and femto gateway (FGW, which in 3GPP namespace is also known as a Home nodeB Gateway or HNBGW) 502*d*. 4G is represented by EUTRAN or E-RAN 503, which includes an LTE UE 503*a* and LTE eNodeB 503*b*. Wi-Fi is represented by Wi-Fi access network 504, which includes a trusted Wi-Fi access point 504*c* and an untrusted Wi-Fi access point 504*d*. The Wi-Fi devices 504*a* and 504*b* may access either AP 504*c* or 504*d*. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501*c* is required for Abis compatibility with BTS 501*b*, while for the 3G UTRAN, an RNC 502*c* is required for Iub compatibility and an FGW 502*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 6:
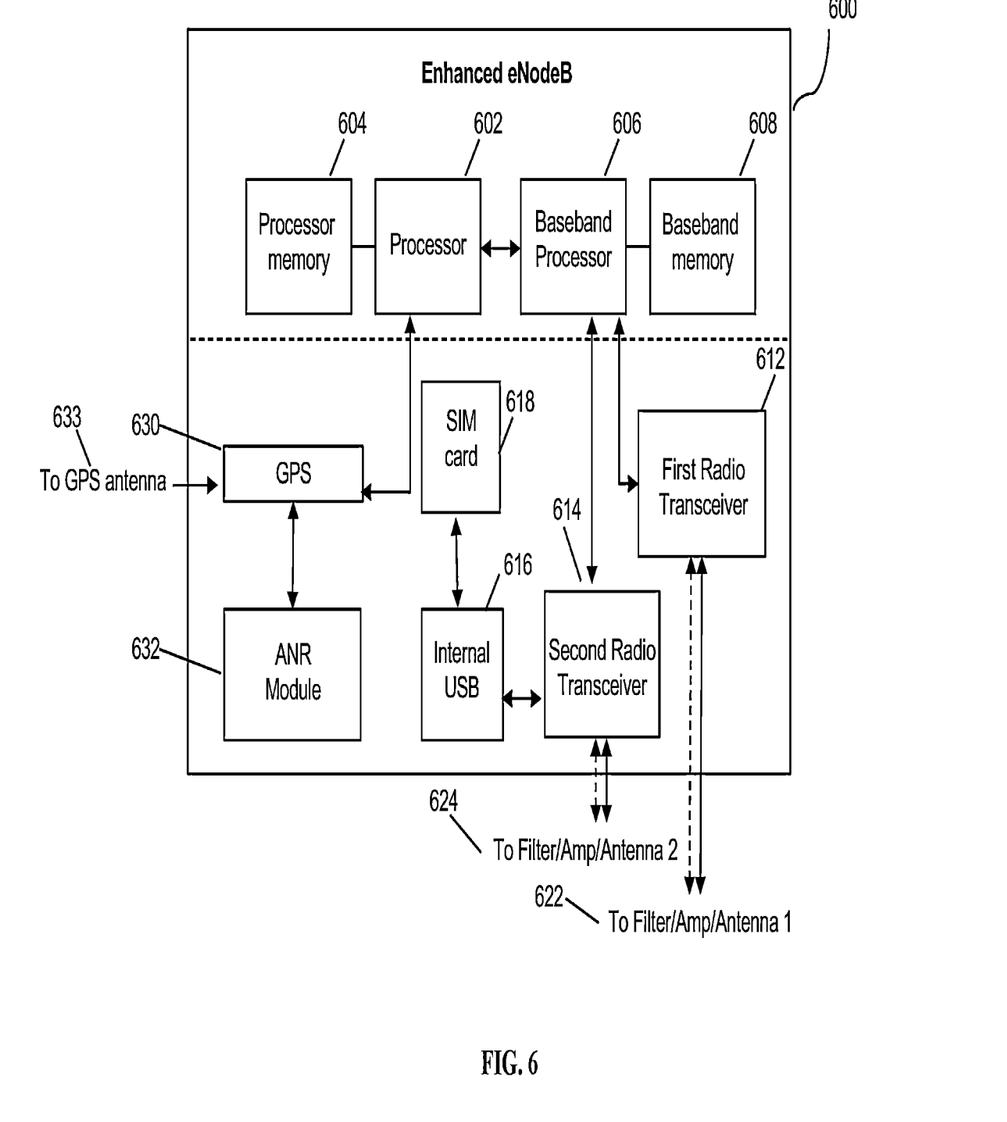
FIG. 6 is an enhanced eNodeB for performing the methods described herein, in accordance with some embodiments.

FIG. 6 shows an enhanced eNodeB for performing the methods described herein, in accordance with some embodiments. eNodeB 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
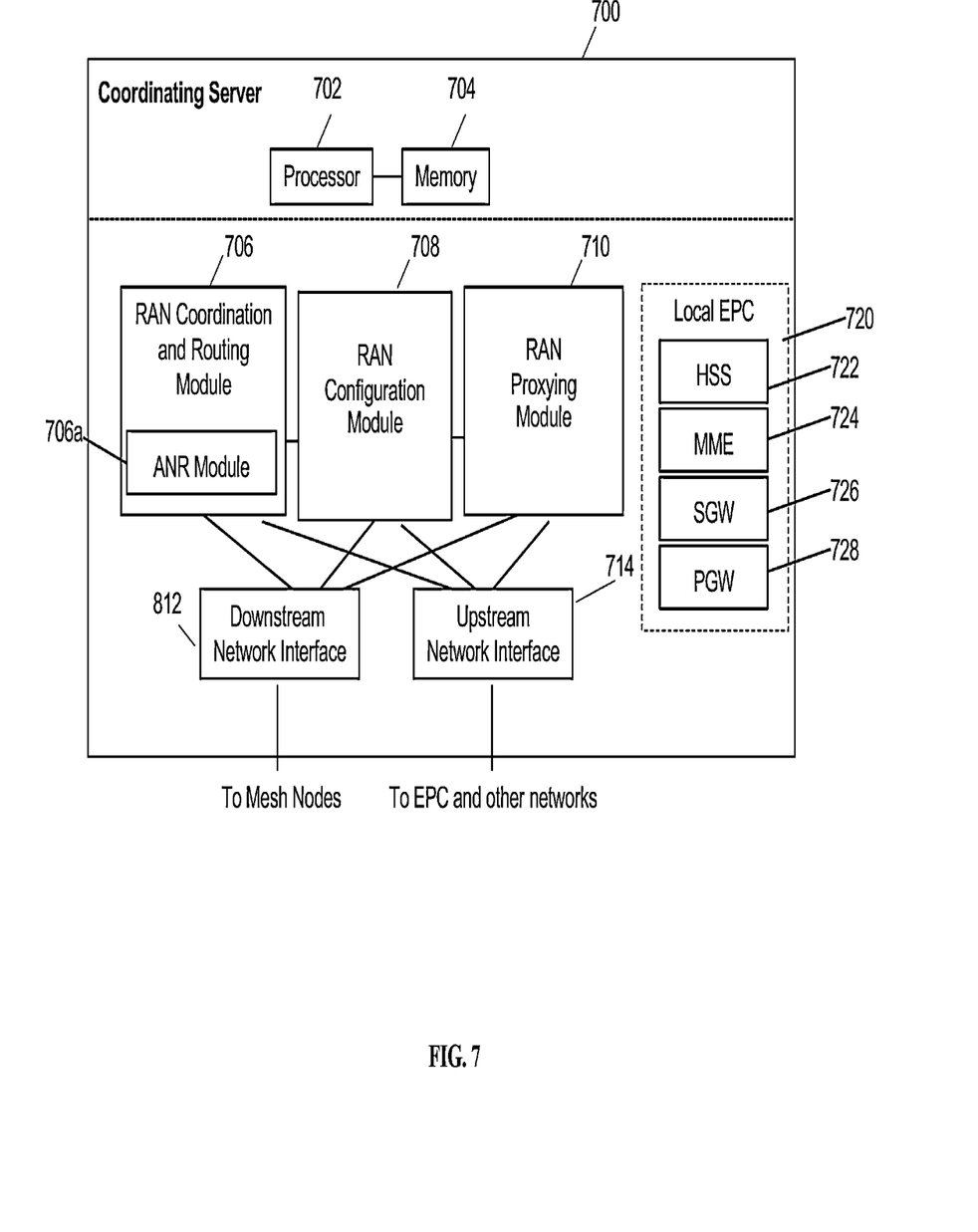
FIG. 7 is a coordinating server for providing services and performing methods as described herein, in accordance with some embodiments.

FIG. 7 shows a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706a, RAN configuration module 708, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method, comprising:
spawning a first Hypertext Transfer Protocol (HTTP) connection for a first received message from a first telecom node to a telecom server, sent using a Representational State Transfer (REST) interface over HTTP;
opening a second HTTP connection for a second received message from a second telecom node, to ensure the second received message is not delayed due to delay in response from the telecom server in response to the first received message from the first telecom node to the telecom server;
receiving a response for the first received message and refraining from closing the first HTTP connection for a predefined idle timeout period;
delivering the response for the first received message to the first telecom node; and
when a third message is received before expiration of the predefined idle timeout period, then using the first HTTP connection instead of opening a new connection.

2. The method of claim 1, further comprising if there is no idle connection available, then using a message send buffer to queue messages to be sent.

3. The method of claim 1, further comprising using a single process for the first and the second HTTP connection.

4. The method of claim 1, further comprising when there is no idle connection available, then tracking a plurality of messages using a response wait list and a message send buffer.

5. The method of claim 1, wherein the HTTP connection is using the HTTP 1.1 protocol.

6. The method of claim 1, further comprising using a response wait list with telecom node keys to enable blocking of messages between a given telecom node to the telecom server until a response is received from the telecom server to the given telecom node.

7. The method of claim 6, further comprising:
marking each message with a specific key which depends on data present in the message, wherein generated data to be delivered in sequence is marked with a same key, and wherein messages having different keys are independent of each other and re delivered parallelly;
spawning a connection when a message is received and sending that message over the connection, wherein all messages with different keys are scheduled parallelly on different connections until a maximum connection limit is reached; and
storing incoming messages in a buffer once the maximum connection limit is reached.

8. A non-transitory computer-readable medium including instructions which, when executed on a telecom server, cause the telecom server to perform operations comprising:
spawning a first Hypertext Transfer Protocol (HTTP) connection for a first received message from a first telecom node to a telecom server, sent using a Representational State Transfer (REST) interface over HTTP;
opening a second HTTP connection for a second received message from a second telecom node, to ensure the second received message is not delayed due to delay in response from the telecom server in response to the first received message from the first telecom node to the telecom server;
receiving a response for the first received message and refraining from closing the first HTTP connection for a predefined idle timeout period;
delivering the response for the first received message to the first telecom node; and
when a third message is received before expiration of the predefined idle timeout period, then using the first HTTP connection instead of opening a new connection.

9. The non-transitory computer-readable medium of claim 8, the instructions further comprising if there is no idle connection available, then using a message send buffer to queue messages to be sent.

10. The non-transitory computer-readable medium of claim 8, the instructions further comprising using a single process for the first and the second HTTP connection.

11. The non-transitory computer-readable medium of claim 8, the instructions further comprising when there is no idle connection available, then tracking a plurality of messages using a response wait list and a message send buffer.

12. The non-transitory computer-readable medium of claim 8, wherein the HTTP connection is using the HTTP 1.1 protocol.

13. The non-transitory computer-readable medium of claim 8, the instructions further comprising using a response wait list with telecom node keys to enable blocking of messages between a given telecom node to the telecom server until a response is received from the telecom server to the given telecom node.

14. The non-transitory computer-readable medium of claim 13, the instructions further comprising:
marking each message with a specific key which depends on data present in the message, wherein generated data to be delivered in sequence is marked with a same key, and wherein messages having different keys are independent of each other and re delivered parallelly;
spawning a connection when a message is received and sending that message over the connection, wherein all messages with different keys are scheduled parallelly on different connections until a maximum connection limit is reached; and
storing incoming messages in a buffer once the maximum connection limit is reached.

* * * * *